United States Patent
Yoshimura et al.

(10) Patent No.: US 11,444,294 B2
(45) Date of Patent: Sep. 13, 2022

(54) METHOD OF OPERATING FUEL CELL SYSTEM

(71) Applicant: HONDA MOTOR CO., LTD., Tokyo (JP)

(72) Inventors: Yusai Yoshimura, Wako (JP); Hideo Numata, Wako (JP); Nobuki Koiwa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 7 days.

(21) Appl. No.: 17/213,752

(22) Filed: Mar. 26, 2021

(65) Prior Publication Data

US 2021/0305596 A1   Sep. 30, 2021

(30) Foreign Application Priority Data

Mar. 30, 2020   (JP) .............................. JP2020-059916

(51) Int. Cl.
*H01M 8/04089* (2016.01)
*H01M 8/04082* (2016.01)
*H01M 8/04223* (2016.01)

(52) U.S. Cl.
CPC ... *H01M 8/04097* (2013.01); *H01M 8/04201* (2013.01); *H01M 8/04223* (2013.01); *H01M 2250/20* (2013.01)

(58) Field of Classification Search
CPC ................................................ H01M 8/04097
See application file for complete search history.

(56) References Cited

U.S. PATENT DOCUMENTS

2006/0153687 A1   7/2006   Ishikawa et al.

FOREIGN PATENT DOCUMENTS

| JP | 4248225 B2 | 4/2009 |
| JP | 2018-152287 A | 9/2018 |
| JP | 2018-156743 A | 10/2018 |

*Primary Examiner* — Brian R Ohara
(74) *Attorney, Agent, or Firm* — Carrier Blackman & Associates, P.C.; Joseph P. Carrier; William D. Blackman (57) ABSTRACT

A fuel cell system includes a fuel cell stack, a fuel gas supply channel, a fuel gas circulation channel, a circulating pump that is driven by a pump motor having no sensor, and an ECU for controlling the rotation of the pump motor. A method for operating the fuel cell system rotates the pump motor when starting, and stops the supply of electric power to the pump motor after the rotational speed of the pump motor has reached a given value, and determines, in an inertial period, whether or not the rotational speed of the pump motor has become equal to or lower than a predetermined value within a given time period.

5 Claims, 7 Drawing Sheets

METHOD OF OPERATING FUEL CELL SYSTEM

CROSS-REFERENCE TO RELATED APPLICATION

This application is based upon and claims the benefit of priority from Japanese Patent Application No. 2020-059916 filed on Mar. 30, 2020, the contents of which are incorporated herein by reference.

BACKGROUND OF THE INVENTION

Field of the Invention

The present invention relates to a method of operating a fuel cell system including a circulating pump for circulating a reactant gas.

Description of the Related Art

A fuel cell system supplies reactant gases (fuel gas, oxygen-containing gas) into a fuel cell stack and generates electricity through electrochemical reactions in the fuel cell stack. Among fuel cell systems of this kind, as disclosed in Japanese Patent No. 4248225, some fuel cell systems have a circulating pump for circulating reactant off-gas discharged from the fuel cell stack (which contains reactant gas unused during power generation) back into the fuel gas supply channel so as to ensure the flow rate of the reactant gas circulated into the fuel cell stack.

The fuel cell system disclosed in Japanese Patent No. 4248225 adopts a circulating pump with a motor having no sensor (sensorless) from the standpoints of cost reduction and size reduction. In this case, the fuel cell system detects the three-phase alternating current supplied from an inverter to the motor of the circulating pump by using a current sensor and calculates the rotational speed of the circulating pump based on the detected signal.

SUMMARY OF THE INVENTION

By the way, in such a fuel cell system, the rotation of the circulating pump may be hindered if water vapor contained in the reactant gas freezes within the circulating pump in a low-temperature environment (e.g., below the freezing point). In particular, if the impeller coupled to the rotor of the circulating pump and the casing of the circulating pump are stuck together, the rotor and the impeller will vibrate based on the supply of power from the inverter.

If the rotor and the impeller vibrate in this way, the control unit of the fuel cell system will calculate wrong rotational speed because the current sensor detects the current based on the induced voltage produced by the motor of the circulating pump. If the control unit varies the amount of reactant gas supplied into the fuel cell stack on the basis of the wrong rotational speed, it may lead to a problem that, for example, an insufficient amount of reactant gas is supplied into the fuel cell stack. Furthermore, the fuel cell stack is more likely to deteriorate if it is frequently supplied with insufficient amounts of fuel gas.

The present invention has been devised to solve this problem, and an object of the invention is to provide a method of operating a fuel cell system that can effectively determine whether a circulating pump is normal or abnormal with a simple configuration so that necessary measures can be taken in the early stages.

In order to achieve the object above, a first aspect of the present invention is directed to a method for operating a fuel cell system including a fuel cell stack, a reactant gas supply channel configured to supply a reactant gas into the fuel cell stack, a reactant gas circulation channel configured to circulate a reactant off-gas discharged from the fuel cell stack back into the reactant gas supply channel, a circulating pump provided on the reactant gas circulation channel and driven by a motor having no rotation detecting sensor, and a control unit configured to control rotation of the motor. The method includes: a first step of causing the control unit to rotate the motor when starting, and stop supply of electric power to the motor after a rotational speed of the motor has reached a given value; and a second step of, in an inertial period in which the motor rotates by inertia after the first step, causing the control unit to determine whether or not the rotational speed of the motor has become equal to or lower than a predetermined value within a given time period. The control unit is configured to determine, in the second step, that the circulating pump is abnormal if the rotational speed has become equal to or lower than the predetermined value.

The method for operating the fuel cell system can reliably determine in a short time whether the pump is operating normally by judging whether the rotational speed of the motor has become equal to or lower than a predetermined value within a given time period in the inertial period in which the motor rotates under its own inertia. This enables the fuel cell system to take necessary measures in the early stages. For example, the fuel cell system can take measures such as increasing the amount of the reactant gas supplied into the fuel cell stack from the reactant gas supply channel, performing a control to promote unfreezing of the circulating pump, and so on. As a result, the fuel cell system can lessen the frequency of supply of insufficient reactant gas to reduce deterioration of the fuel cell stack.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

The present invention will be described in detail in connection with preferred embodiments while referring to the accompanying drawings.

Figure 1:
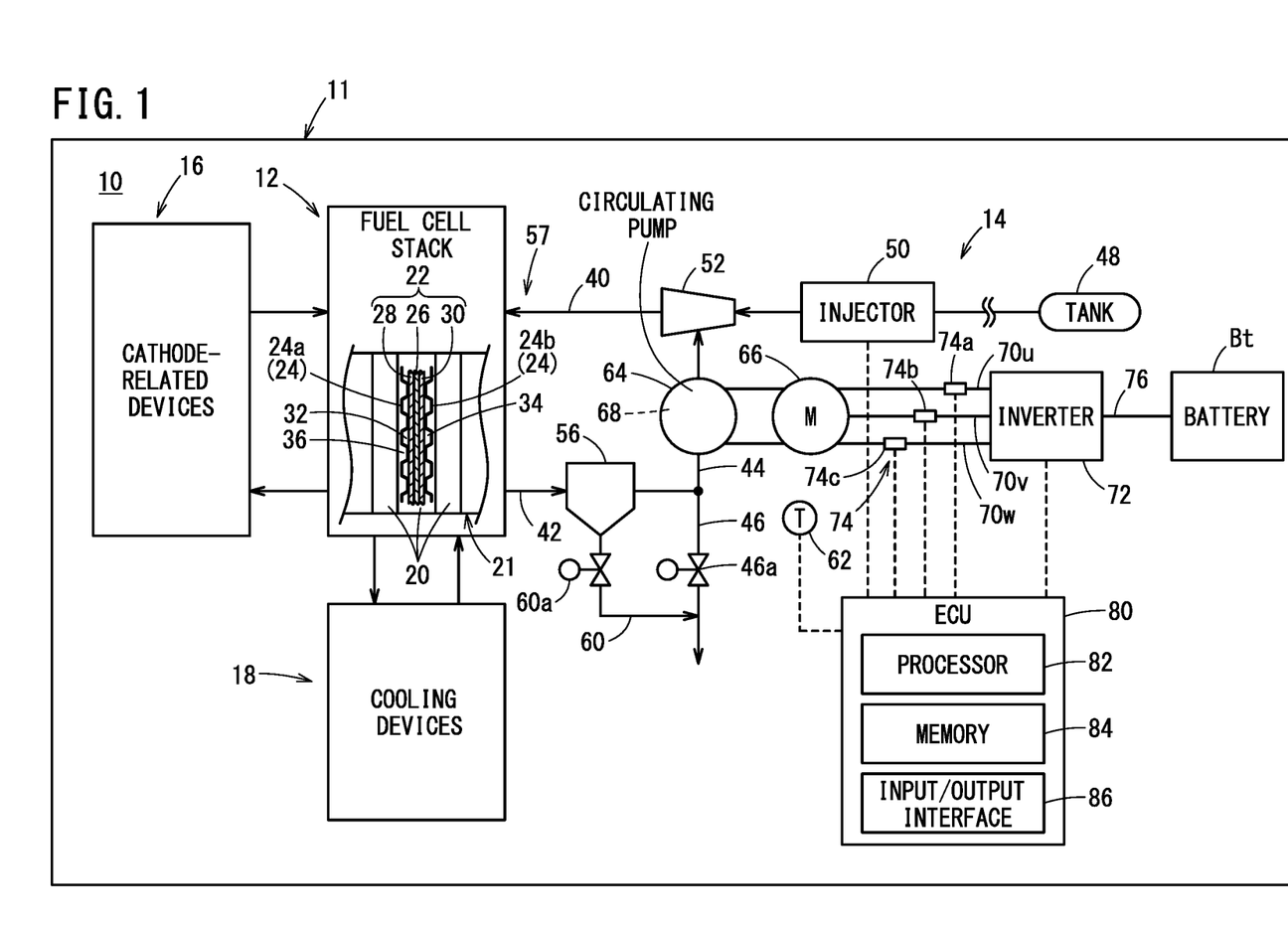
FIG. 1 is an explanatory diagram illustrating an overall configuration of a fuel cell system according to an embodiment of the present invention.

As shown in FIG. 1, a fuel cell system 10 according to an embodiment of the present invention includes a fuel cell stack 12, fuel-gas-related devices 14, oxygen-containing-gas-related devices 16, and cooling devices 18. The fuel cell system 10 is installed in a motor room of a fuel cell automobile (which will hereinafter be simply referred to as vehicle 11). The fuel cell system 10 supplies the electric power generated by the fuel cell stack 12 to a battery Bt of the vehicle 11, its drive motor (not shown), and so on. The fuel cell system 10 is not limited to applications in which it is mounted in the vehicle 11, and may be used in stationary systems, for example.

The fuel cell stack 12 includes a plurality of power generation cells 20 that generate electricity through electrochemical reactions between reactant gases, i.e. a fuel gas (a hydrogen gas, anode gas) and an oxygen-containing gas (oxygen contained in air, cathode gas). The plurality of power generation cells 20 are stacked along the vehicle width direction in such a manner that their respective electrode planes are in a standing position when the fuel cell stack 12 is mounted in the vehicle 11. The plurality of power generation cells 20 may be stacked along the length direction of the vehicle 11 (front-rear direction) or the gravity direction.

Each power generation cell 20 includes a membrane electrode assembly 22 (hereinafter referred to as "MEA 22") and a pair of separators 24 (first and second separators 24a and 24b) that sandwich the MEA 22 therebetween. The MEA 22 includes an electrolyte membrane 26 (e.g. solid polymer electrolyte membrane (cation exchange membrane)), an anode 28 provided at one surface of the electrolyte membrane 26, and a cathode 30 provided at the other surface of the electrolyte membrane 26. The first separator 24a and the MEA 22 form a fuel gas flow field 32 therebetween through which the fuel gas flows along the separator surface. The second separator 24b and the MEA 22 form an oxygen-containing gas flow field 34 therebetween through which the oxygen-containing gas flows along the separator surface. Further, as the plurality of power generation cells 20 are stacked, a first separator 24a and a second separator 24b form a coolant flow field 36 therebetween through which a coolant flows along the separator surfaces.

The fuel cell stack 12 further includes a plurality of passages (fuel gas passages, oxygen-containing gas passages, and coolant passages, which are not shown) for respectively conveying the fuel gas, the oxygen-containing gas, and the coolant along the stacking direction of a stack 21. The fuel gas passages communicate with the fuel gas flow field 32, the oxygen-containing gas passages communicate with the oxygen-containing gas flow field 34, and the coolant passages communicate with the coolant flow field 36.

The fuel cell stack 12 is supplied with the fuel gas through the fuel-gas-related devices 14. In the fuel cell stack 12, the fuel gas flows through the fuel gas passage (fuel gas inlet passage) into the fuel gas flow field 32 and is used to generate power at the anode 28. The fuel off-gas, which contains fuel gas not used (unreacted) in the power generation and water, flows out of the fuel gas flow field 32 into the fuel gas passage (fuel gas outlet passage) and is discharged out of the fuel cell stack 12 into the fuel-gas-related devices 14.

The fuel cell stack 12 is further supplied with the oxygen-containing gas through the oxygen-containing-gas-related devices 16. In the fuel cell stack 12, the oxygen-containing gas flows through the oxygen-containing gas passage (oxygen-containing gas inlet passage) into the oxygen-containing gas flow field 34, and is used to generate power at the cathode 30. The oxygen-containing off-gas, which contains oxygen-containing gas not used (unreacted) in the power generation and water, flows out of the oxygen-containing gas flow field 34 into the oxygen-containing gas passage (oxygen-containing gas outlet passage) and is discharged out of the fuel cell stack 12 into the oxygen-containing-gas-related devices 16.

The fuel cell stack 12 is further supplied with the coolant through the cooling devices 18. In the fuel cell stack 12, the coolant flows through the coolant passage (coolant inlet passage) into the coolant flow field 36 to adjust the temperature of the power generation cell 20. Having adjusted the temperature of the power generation cell 20, the coolant flows out of the coolant flow field 36 into the coolant passage (coolant outlet passage) and is discharged out of the fuel cell stack 12 into the cooling devices 18.

The fuel-gas-related devices 14 of the embodiment form a circulation circuit that circulates the fuel off-gas (unreacted fuel gas) discharged from the fuel cell stack 12 back into the fuel gas supply side. The fuel-gas-related devices 14 will be specifically described below.

The fuel-gas-related devices 14 include a fuel gas supply channel 40 for supplying the fuel gas into the fuel cell stack 12, and a fuel gas discharge channel 42 for discharging the fuel off-gas from the fuel cell stack 12. Further, a fuel gas circulation channel 44 is provided between the fuel gas supply channel 40 and the fuel gas discharge channel 42 so as to circulate the fuel off-gas in the fuel gas discharge channel 42 back into the fuel gas supply channel 40. A purge channel 46 for discharging the fuel off-gas is connected to the fuel gas circulation channel 44.

A tank 48 storing high-pressure fuel gas is connected to the upstream end of the fuel gas supply channel 40. The tank 48 sends the fuel gas into the fuel gas supply channel 40 on the basis of the opening/closing of an in-tank electromagnetic valve (not shown) and a pressure reducing valve (not shown) provided on the way therefrom.

An injector 50 for controlling the flow rate of the fuel gas supplied into the fuel cell stack 12 is provided on the fuel gas supply channel 40 downstream of the tank 48. While the fuel cell system 10 is operating, the injector 50 opens and closes on the upstream side (higher-pressure side) of the fuel gas supply channel 40 to inject a given amount of fuel gas to the downstream side (lower-pressure side). FIG. 1 shows a configuration including one injector 50, but a plurality of injectors 50 may be provided on the fuel gas supply channel 40. When a plurality of injectors 50 are present, some of them may be provided on a bypass channel (not shown) that bypasses an ejector 52 described next.

The ejector 52 is provided downstream of the injector 50 on the fuel gas supply channel 40. The ejector 52 supplies the fuel gas into the fuel cell stack 12 provided downstream, while drawing the fuel off-gas from the fuel gas circulation channel 44 by utilizing the negative pressure produced by the movement of the fuel gas injected from the injector 50.

Further, a gas-liquid separator 56 is provided between the fuel gas discharge channel 42 and the fuel gas circulation channel 44 so as to separate liquid (liquid water formed in power generation) and gas (fuel gas, water vapor, nitrogen gas, etc.) that are contained in the fuel off-gas. Connected to the bottom of the gas-liquid separator 56 is one end of a drain channel 60 for discharging the separated liquid. The drain channel 60 has a drain valve 60a for opening and closing the channel, and the drain channel 60 is connected to the purge channel 46. The purge channel 46 discharges the fuel gas and nitrogen gas from the fuel gas circulation channel 44 to thereby increase the hydrogen gas concentration inside the circulation passage that is formed by the fuel gas supply channel 40 downstream of the ejector 52, the fuel gas discharge channel 42, and the fuel gas circulation channel 44. A purge valve 46a for opening and closing the channel is provided on the purge channel 46 in a position upstream of the connection with the drain channel 60.

The fuel gas circulation channel 44 is connected to an upper portion of the gas-liquid separator 56, and the fuel off-gas from which liquid water has been separated flows therethrough. A circulating pump 64 for circulating the fuel off-gas into the fuel gas supply channel 40 is provided on the fuel gas circulation channel 44. The fuel-gas-related devices 14 further include a temperature sensor 62 for detecting a temperature in the surrounding environment around the circulating pump 64.

The temperature sensor 62 can be a sensor that directly detects the temperature of the circulating pump 64 itself, or may adopt a temperature sensor that is conventionally included in the fuel-gas-related devices 14. For example, such a temperature sensor 62 conventionally included in the fuel-gas-related devices 14 can be a temperature sensor that is provided at the fuel gas discharge channel 42 or the gas-liquid separator 56 so as to detect the temperature of the fuel off-gas discharged from the fuel cell stack 12.

The circulating pump 64 has a pump motor 66 having a stator and a rotor (both not shown), and an impeller 68 coupled to the rotor. The impeller 68 rotates within the space in the pump casing (not shown) that communicates with the fuel gas circulation channel 44, to thereby circulate the fuel off-gas present in the space. The circulating pump 64 of this embodiment is of the sensorless type having no rotation detecting sensor, such as an encoder etc., for directly detecting the rotational speed of the rotor or the impeller 68.

The pump motor 66 is an alternating-current motor that rotates the rotor under the supply of three-phase alternating-current power. Accordingly, an inverter 72 is connected to the pump motor 66 through three-phase alternating-current lines 70$u$, 70$v$, 70$w$. The pump motor 66 of this embodiment is configured as a synchronous motor that rotates in synchronization with the frequency of the alternating current.

On the three lines 70$u$, 70$v$, 70$w$, current sensors 74 are provided to detect the states of the alternating currents supplied to the pump motor 66. More specifically, the current sensors 74 include a current sensor 74a provided on the line 70$u$, a current sensor 74b provided on the line 70$v$, and a current sensor 74c provided on the line 70$w$. The current sensors 74a, 74b, 74c can be any suitable sensors that can detect the amplitudes and periods (in other words, the pulse shapes) of the currents flowing through the lines 70$u$, 70$v$, 70$w$.

The inverter 72 is connected to the battery Bt serving as a power supply source through a line 76. Though not shown in the drawing, a converter or the like may be provided on the line 76 between the inverter 72 and the battery Bt so as to step down the voltage supplied from the battery Bt. The inverter 72 converts the direct-current power supplied from the battery Bt into three-phase alternating-current power and outputs the converted three-phase alternating-current power to the lines 70$u$, 70$v$, 70$w$. The inverter 72 is communicably connected to an ECU (Electronic Control Unit: control unit) 80 that controls the fuel-gas-related devices 14, and the inverter 72 controls the current, voltage, period, etc. of the three-phase alternating-current power supplied to the pump motor 66, on the basis of operation commands from the ECU 80.

The battery Bt is charged by being supplied with the electric power generated by the fuel cell stack 12, or the regenerative power from the drive motor. The battery Bt discharges an appropriate amount of electric power to the inverter 72 under the control of the power train (the inverter 72 in FIG. 1).

The ECU 80 is configured as a computer including a processor 82, a memory 84, and an input/output interface 86. The above-described temperature sensor 62 and current sensors 74 (current sensors 74a to 74c), and a power generation ECU 88 (see FIG. 2) for controlling the entirety of the fuel cell system 10, are communicably connected to the ECU 80. The ECU 80 may be provided within the power generation ECU 88. During normal power generation of the fuel cell stack 12, the ECU 80 controls the operations of the fuel-gas-related devices 14 by configuring functional units therein as shown in FIG. 2, by the processor 82 executing programs (not shown) stored in the memory 84.

Figure 2:
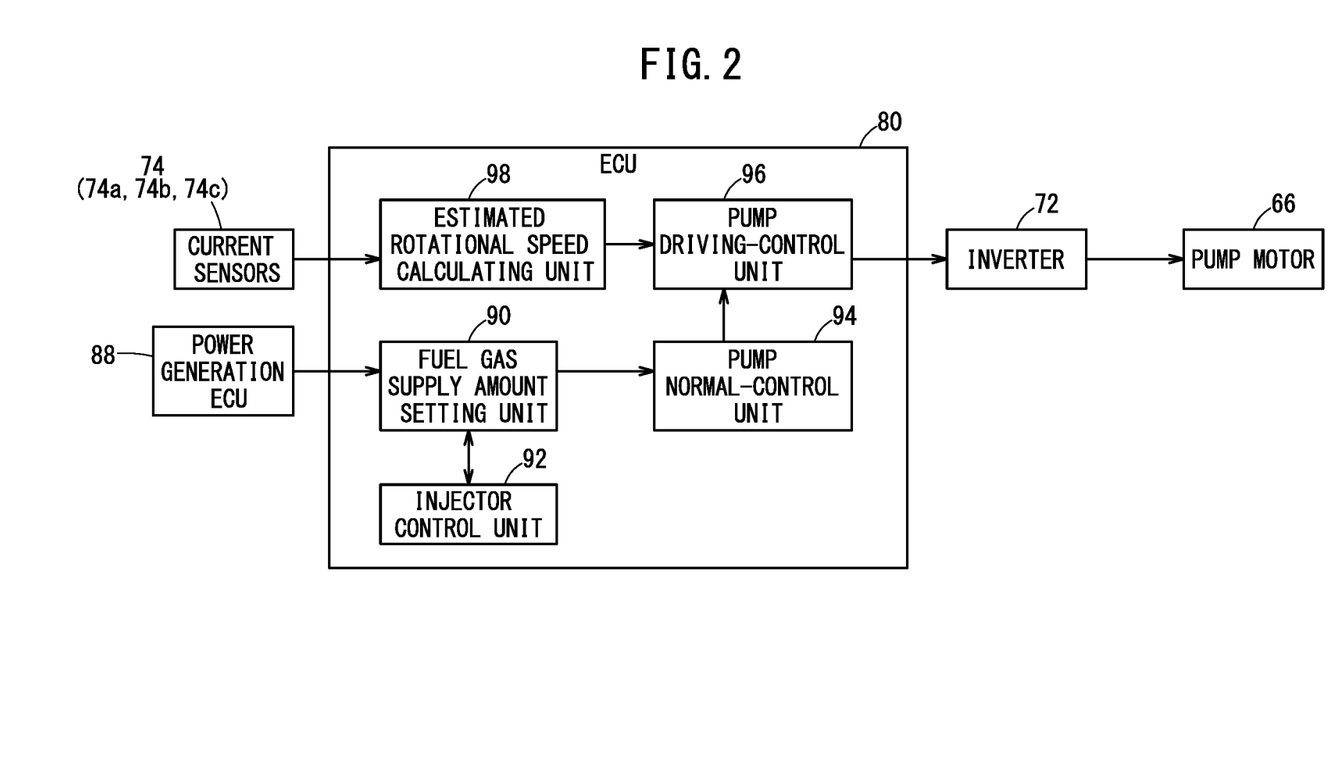
FIG. 2 is a block diagram illustrating a configuration in an ECU that performs normal control operation of a circulating pump.

As shown in FIG. 2, the ECU 80 configures therein a fuel gas supply amount setting unit 90, an injector control unit 92, a pump normal-control unit 94, a pump driving-control unit 96, and an estimated rotational speed calculating unit 98.

The fuel gas supply amount setting unit 90 sets the amount of fuel gas supplied into the fuel cell stack 12, based on the amount of power generation requirement from the power generation ECU 88. Based on the amount of supply of the fuel gas set by the fuel gas supply amount setting unit 90, the injector control unit 92 calculates the contents of operation of the injector 50 (i.e. the amount of fuel gas injected from the tank 48 side), and controls the injector 50 based on the contents of operation.

On the other hand, the pump normal-control unit 94 calculates a target rotational speed of the circulating pump 64 (i.e., the amount of the fuel off-gas circulated from the fuel gas circulation channel 44) based on the amount of supply of the fuel gas that is set by the fuel gas supply amount setting unit 90. Based on the target rotational speed of the circulating pump 64, the pump driving-control unit 96 sets the conditions of the three-phase alternating-current power supplied to the circulating pump 64, and outputs corresponding operation commands to the inverter 72. This causes the inverter 72 to supply three-phase alternating-current power according to the target rotational speed to thereby rotate the pump motor 66.

Then, the estimated rotational speed calculating unit 98 calculates an estimated rotational speed of the pump motor 66 based on the signals detected by the current sensors 74a, 74b, 74c that are inputted to the ECU 80. Specifically, as to the pump motor 66, the supplied three-phase alternating-current power includes a phase not passing current (being off), and the ECU 80 receives the detection signal of the current sensor 74 corresponding to this phase, and detects the position of the rotor based on a given point (e.g. the zero point) of the detected current. Then, the estimated rotational speed calculating unit 98 monitors the position of the rotor to calculate (estimate) an actual rotational speed of the pump motor 66. Further, the pump driving-control unit 96 is supplied (fed back) with the calculated, estimated rotational speed, and controls the operation commands to the inverter 72 so that this estimated rotational speed coincides with the target rotational speed.

Now, when the vehicle 11 is stopped in a low-temperature environment below the freezing point (at or below zero degrees), for example, and if the fuel off-gas contains water vapor as mentioned earlier, then the water vapor will freeze into ice inside the pump casing of the circulating pump 64.

In this case, the inner wall of the pump casing (not shown) and the impeller 68 may get stuck together, and the impeller 68 will become unable to rotate.

However, when electric power is supplied from the inverter 72, the rotor of the pump motor 66 and the impeller 68 vibrate even when they are stuck and cannot rotate. For example, the impeller 68 to which the rotor is coupled vibrates at a natural vibration period in a range of about 16 kHz to 40 kHz to thereby cause, at the stator, an induced voltage (induced electromotive force) corresponding to the natural vibration period from the pump motor 66. If the current sensors 74 detect the currents based on the induced voltage, the ECU 80 then calculates a high estimated rotational speed (e.g. about 13000 rpm) based on the period of vibration and recognizes that the pump motor 66 is rotating at this estimated rotational speed.

Now, referring to the graph of FIG. 3, the condition where the estimated rotational speed rises if the circulating pump 64 is frozen will be described in more detail. In a conventional case, when the vehicle 11 starts from a stopped state, normal control operation is performed to cause the fuel cell stack 12 to generate power normally. Then, as shown by broken line in FIG. 3, a substantially constant target rotational speed of the pump motor 66 is set at time ta. The inverter 72 controls the electric power supplied to the pump motor 66 on the basis of the operation command corresponding to this target rotational speed.

Then, the impeller 68 vibrates if the impeller 68 is frozen and stuck (or is melting) in the pump casing of the circulating pump 64 in a low-temperature environment. Accordingly, in the conventional case, as shown by solid lines 78 in FIG. 3, estimated rotational speeds exceeding the given target rotational speed are calculated when the impeller 68 vibrates, as a current detection signal based on the induced voltage detected by a certain current sensor 74 (current sensor 74a, 74b, or 74c corresponding to the off phase) is received.

Figure 3:
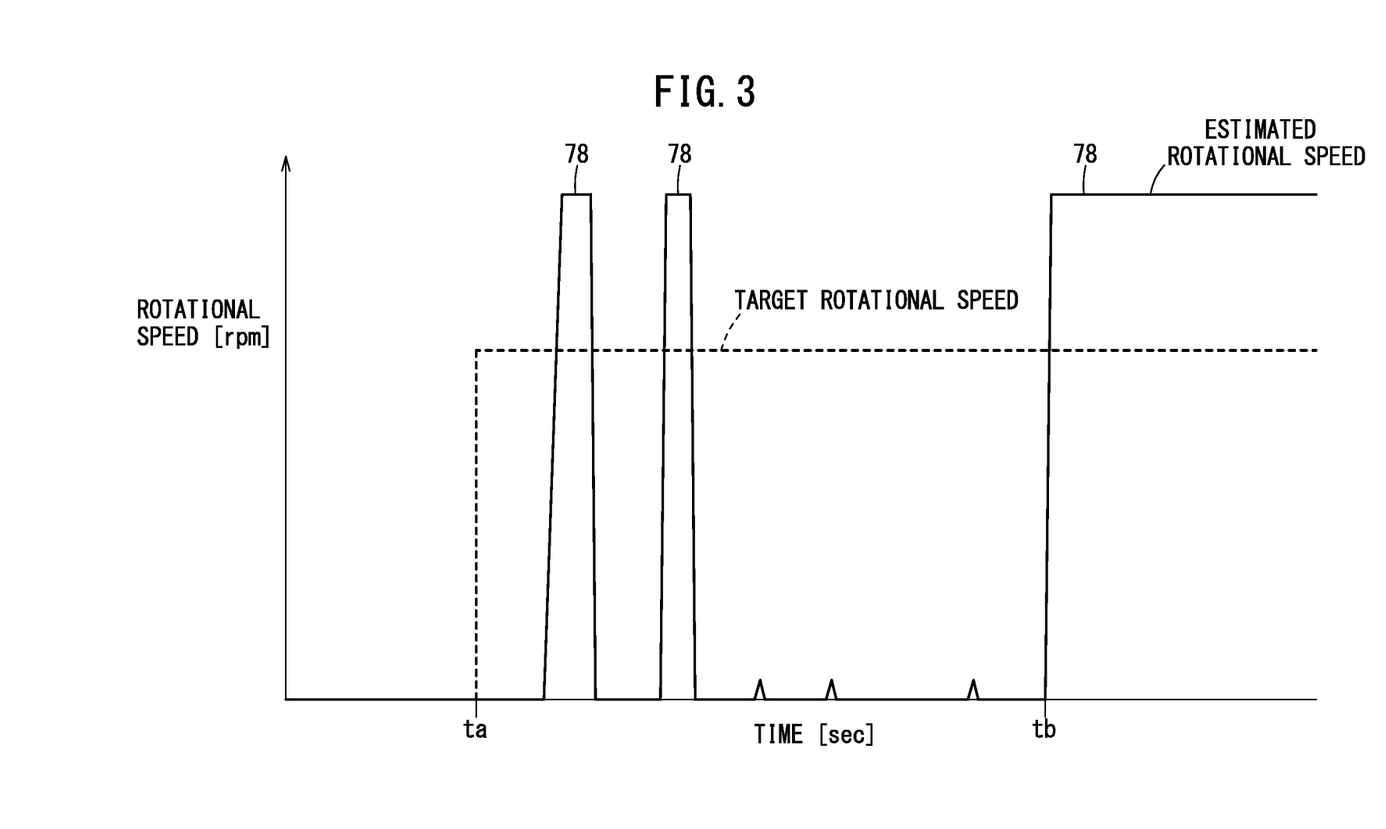
FIG. 3 is a graph illustrating a relationship between target rotational speed and estimated rotational speed.

For example, if the impeller 68 is frozen and stuck, the rotor vibrates in an attempt to move out of the adhesion, which causes the estimated rotational speed to form a peaked shape that rises abruptly over the target rotational speed and then falls abruptly (see time ta to time tb in FIG. 3). The rotor vibrates even while the fixed impeller 68 is melting, and hence an estimated rotational speed that is higher than the target rotational speed is calculated steadily and continuously (see the period after time tb in FIG. 3) until the impeller 68 gets out of the adhesion.

Accordingly, if a control operation is performed based on this estimated rotational speed so as to reduce the amount of injection of the fuel gas from the injector 50, or to reduce the rotation of the circulating pump 64, for example, then the supply of the fuel gas into the fuel cell stack 12 will become insufficient. In addition, if the supply of the fuel gas is insufficient frequently, it will hasten the deterioration of the fuel cell stack 12.

Figure 4:
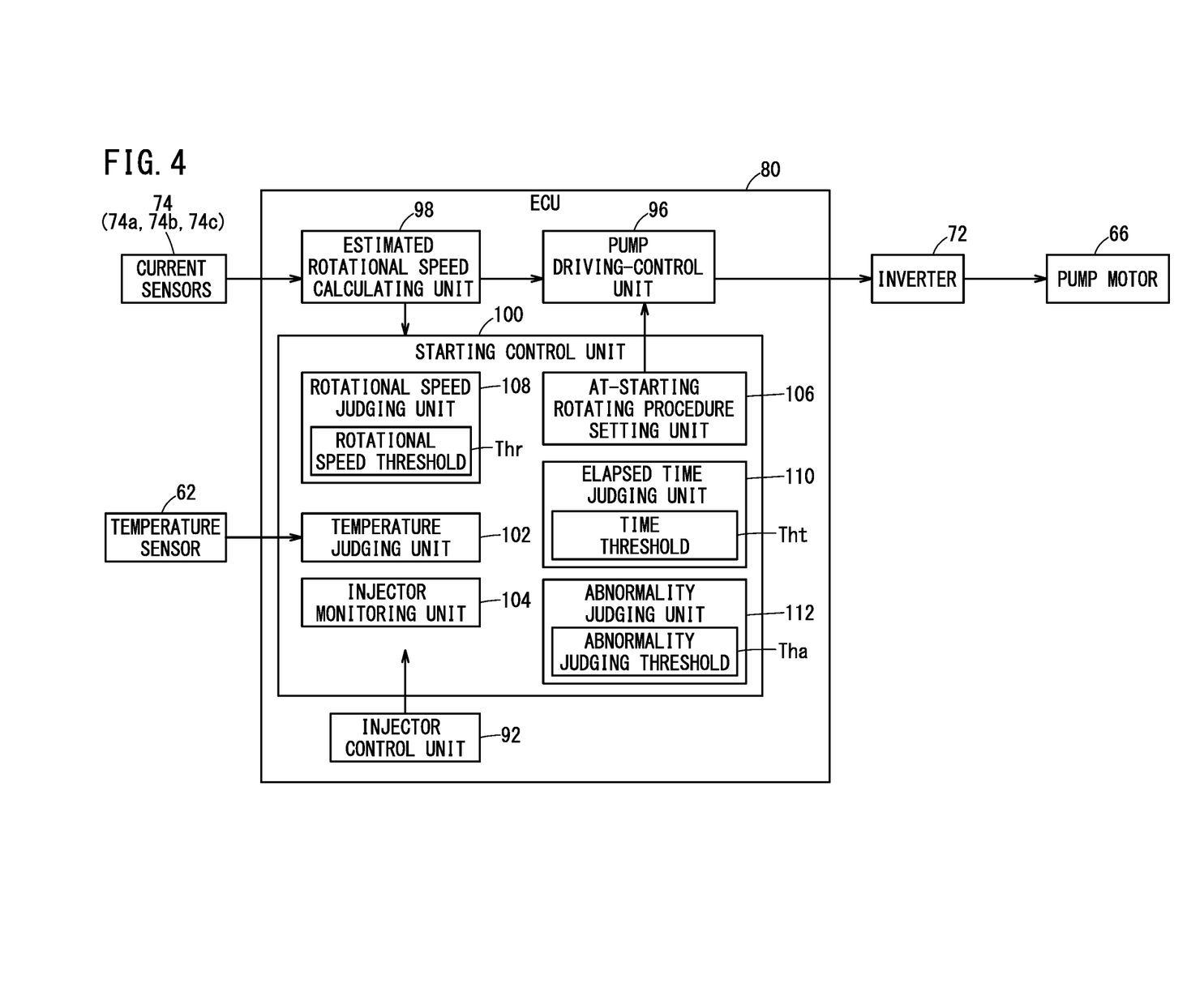
FIG. 4 is a block diagram illustrating a configuration in the ECU that is formed when the fuel cell system is started.

To solve this problem, when starting in a low-temperature environment, the fuel cell system 10 of the embodiment configures a starting control unit 100 in the ECU 80 as shown in FIG. 4 to perform an at-starting freezing judging control process to judge whether the circulating pump 64 is frozen. The starting control unit 100 includes therein a temperature judging unit 102, an injector monitoring unit 104, an at-starting rotating procedure setting unit 106, a rotational speed judging unit 108, an elapsed time judging unit 110, and an abnormality judging unit 112.

As a condition for the execution of the at-starting freezing judging control, the temperature judging unit 102 determines whether the temperature in the surrounding environment around the fuel cell system 10 is low on the basis of a signal detected by the temperature sensor 62. The temperature condition for performing the at-starting freezing judging control is not particularly limited; for example, the condition can be whether or not the surrounding temperature is equal to or lower than zero degrees. Alternatively, the fuel cell system 10 may be configured to immediately perform the at-starting freezing judging control without judging the temperature when starting.

The injector monitoring unit 104 monitors the contents of control of the injector control unit 92 or the operation of the injector 50 itself, so as to judge whether the injector 50 is operating to supply the fuel gas into the fuel cell stack 12. That is, if the injector 50 is operating, the impeller 68 of the circulating pump 64 is rotated by the flow of the fuel gas through the fuel cell stack 12, the fuel gas discharge channel 42, and the fuel gas circulation channel 44 in this order. In order to distinguish whether the impeller 68 is being rotated in this way or the impeller 68 is stuck and vibrating, the starting control unit 100 is configured to perform the at-starting freezing judging control under the condition that the injector 50 is not operating.

The at-starting rotating procedure setting unit 106 rotates the pump motor 66 according to a preset procedure (mode order) during the execution of the at-starting freezing judging control operation. That is, the at-starting rotating procedure setting unit 106 sequentially sets target rotational speeds based on the modes, and output them to the above-described pump driving-control unit 96. The pump driving-control unit 96 then outputs operation commands to the inverter 72 based on the target rotational speed of each mode.

Figure 5:
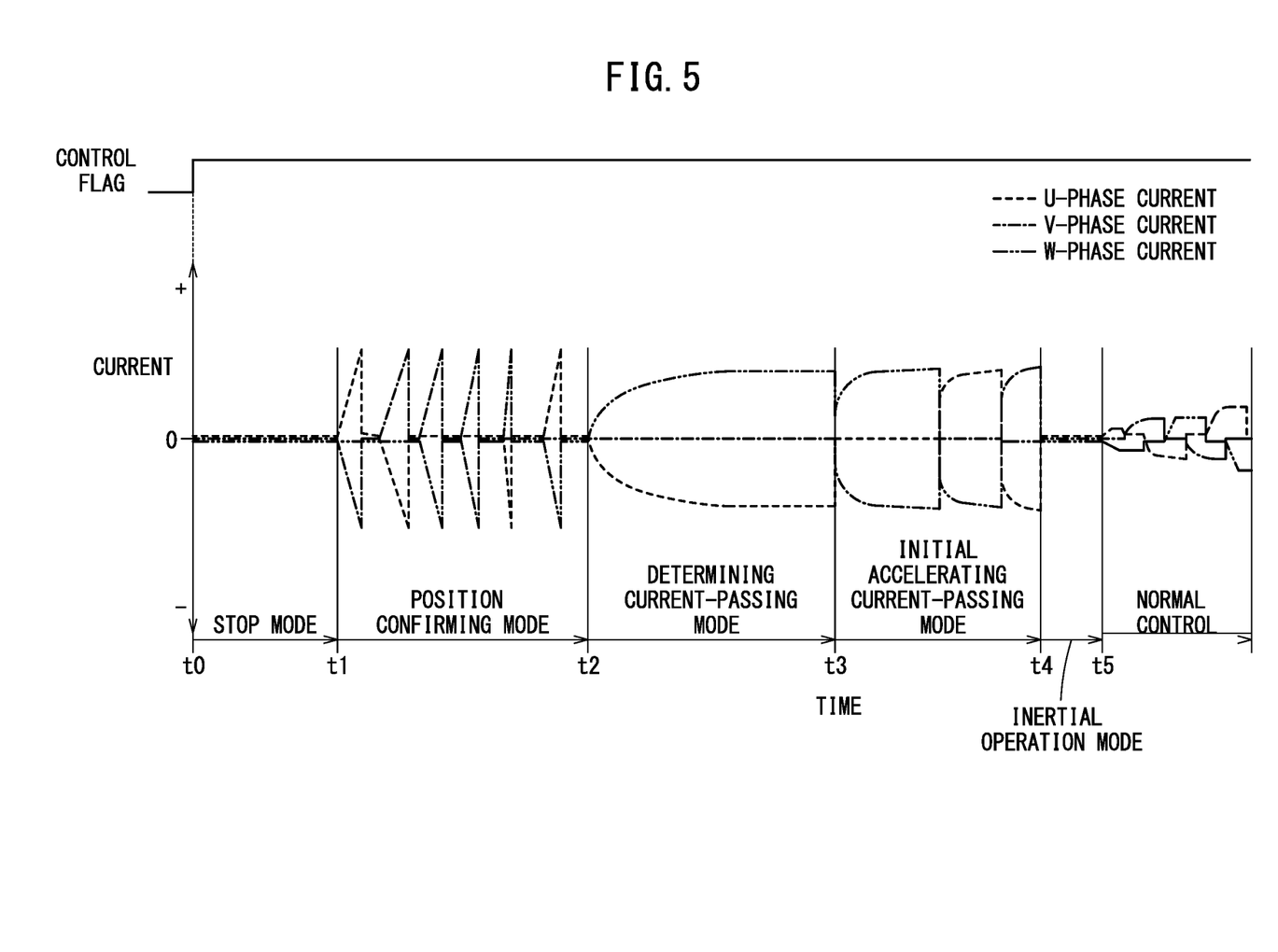
FIG. 5 is a graph illustrating conditions of current outputted from an inverter in individual modes at the time of starting.

For example, as shown in FIG. 5, when starting the fuel cell system 10, the ECU 80 judges the temperature for the execution of the at-starting freezing judging control operation before time t0, and sets a control flag indicating the execution of the at-starting freezing judging control. Then, the at-starting rotating procedure setting unit 106 first performs a stop mode in the period from time t0 to time t1 in which the rotation of the pump motor 66 is stopped.

Next, the at-starting rotating procedure setting unit 106 performs a position confirming mode in the period from time t1 to time t2 to detect the stopped position of the rotor. In this position confirming mode, the pump motor 66 is electrified by an output of the inverter 72 that has a waveform in which one phase of the three-phase alternating currents remains off (zero) and the other two phases output currents in the opposite plus and minus directions with sufficiently short pulse widths, for example. Then, the pump motor 66 once fixes the position of the rotor, and the estimated rotational speed calculating unit 98 in the ECU 80 grasps the rotor position on the basis of the detection signals obtained at this time from the current sensors 74.

After detecting the rotor position (after time t2), the at-starting rotating procedure setting unit 106 performs a determining current-passing mode in the period from time t2 to time t3. In this determining current-passing mode, based on the detected rotor position, given two phases output currents in the opposite plus and minus directions with a sufficiently long pulse width.

Furthermore, in the period from time t3 to t4, the at-starting rotating procedure setting unit 106 performs an initial accelerating current-passing mode. In the initial accelerating current-passing mode, the phases of the three-phase alternating currents are shifted in such a manner as to gradually narrow the period from a relatively long period, to thereby rotate the rotor smoothly with high torque. The pump motor 66 thus raises its rotational speed.

In this process, the rotational speed judging unit 108 acquires the estimated rotational speed calculated by the estimated rotational speed calculating unit 98 and determines whether the estimated rotational speed has become equal to or higher than a given value (rotational speed threshold Thr). The rotational speed threshold Thr is not particularly limited as long as it is equal to or higher than a rotational speed at which the induced voltage can be detected (e.g. 300 rpm), and it is set within a range from about 1000 rpm to 4000 rpm. The rotational speed threshold Thr in this embodiment is set to 2500 rpm. If the estimated rotational speed is less than the rotational speed threshold Thr, the rotational speed judging unit 108 continues the initial accelerating current-passing mode. On the other hand, if the estimated rotational speed is equal to or higher than the rotational speed threshold Thr, the rotational speed judging unit 108 moves to the next inertial operation mode. The period from the stop mode to the initial accelerating current-passing mode (from time t0 to time t4) is a short period around several hundred ms and hence produces no influence of rotation delay of the pump motor 66.

In the inertial operation mode after time t4, the at-starting rotating procedure setting unit 106 temporarily cuts off (stops) the three-phase alternating-current power supplied to the pump motor 66, thus causing the rotor of the pump motor 66 and the impeller 68 to rotate by inertia. Then, during the period of execution of the inertial operation mode (inertial period), the starting control unit 100 checks the condition of rotation of the rotor to judge whether the circulating pump 64 is frozen.

That is, no current is passed to rotate the pump motor 66 in the inertial operation mode. Accordingly, if the circulating pump 64 is not frozen (if the impeller 68 is not stuck), the pump motor 66 continues rotating under its inertia and its rotational speed lowers gradually. On the other hand, if the circulating pump 64 is frozen (if the impeller 68 is stuck), then the vibration of the rotor and the impeller 68 terminates. Accordingly, the estimated rotational speed rapidly falls to no rotation (the estimated rotational speed becomes zero) even though the estimated rotational speed was calculated high due to the vibration of the rotor and the impeller 68 before the inertial operation mode.

In the starting control unit 100, after time t4 at which the inertial operation mode is started, the elapsed time judging unit 110 counts time and judges the period of the execution of the inertial operation mode (whether the counted time has reached a given time threshold Tht (given time)). The time threshold Tht can be designed in an arbitrary manner. It can be a short time from around 20 ms to 200 ms, and is set to 30 ms in this embodiment. When the elapsed time judging unit 110 judges that the counted time has exceeded the time threshold Tht, the abnormality judging unit 112 in the starting control unit 100 judges whether the circulating pump 64 is normal or abnormal (i.e. whether the circulating pump 64 is frozen or not). The inertial operation mode may be set to continue after the time threshold Tht has elapsed (the period of the execution of the inertial operation mode is longer than the time threshold Tht).

Specifically, after the execution of the inertial operation mode for the given time period, the abnormality judging unit 112 monitors the rotational speed of the rotor and the impeller 68 based on the detection signals from the current sensors 74. That is, if the circulating pump 64 is normal (not frozen), the rotor and the impeller 68 continue rotating even after the given time period has passed. On the other hand, if the circulating pump 64 is abnormal (frozen), the rotor and the impeller 68 are frozen and stuck (unable to rotate), in which case the vibration of the rotor and the impeller 68 is stopped after the given time period has passed, and then the calculated rotational speed becomes zero (or around zero).

Accordingly, the abnormality judging unit 112 compares the estimated rotational speed that is estimated on the basis of the detection signals from the current sensors 74 with an abnormality judging threshold Tha (a value of the rotational speed of the pump motor 66: a predetermined value) that has been previously retained. The abnormality judging threshold Tha depends on the rotational speed before the execution of the inertial operation mode, but it is preferably set at or below 300 rpm, and is set to 0 rpm in this embodiment.

In the inertial operation mode, the inverter 72 does not supply the three-phase alternating-current power to the pump motor 66. Hence, the three current sensors 74a, 74b, 74c can purely detect the currents based on the induced voltage (induced electromotive force) of the pump motor 66. Then, the estimated rotational speed calculating unit 98 can more accurately obtain the estimated rotational speed of the pump motor 66 in the inertial operation mode, by calculating (or by correcting, for example) the estimated rotational speed of the pump motor 66 by using the signals detected by the individual current sensors 74a, 74b, 74c.

The abnormality judging unit 112 judges that the circulating pump 64 is normal (not frozen) if the estimated rotational speed exceeds the abnormality judging threshold Tha, and judges that the circulating pump 64 is abnormal (frozen) if the estimated rotational speed is equal to or lower than the abnormality judging threshold Tha.

Then, if the circulating pump 64 is normal, the starting control unit 100 terminates the at-starting freezing judging control operation after ending the inertial operation mode, and the ECU 80 performs normal control operation immediately to rotate the pump motor 66 so as to achieve the target rotational speed that is set by the pump normal-control unit 94. The ECU 80 can thus move to normal control operation without lowering the rotation of the pump motor 66 almost at all, despite the fact that it performed the inertial operation mode.

On the other hand, if the circulating pump 64 is abnormal, the starting control unit 100 terminates the at-starting freezing judging control operation after ending the inertial operation mode, and the ECU 80 performs abnormality control operation according to the abnormality of the circulating pump 64. For example, the abnormality control operation can be a control operation to promote the unfreezing of the circulating pump 64, or a control operation to increase the amount of injection from the injector 50. The ECU 80 can then supply the fuel gas to the fuel cell stack 12 in an appropriate manner.

The fuel cell system 10 of the embodiment is configured basically as described above. Next, a method for operating the fuel cell system 10 will be described.

When starting, the fuel-gas-related devices 14 of the fuel cell system 10 perform the at-starting freezing judging control operation in order to judge whether the circulating pump 64 is frozen or not in a low-temperature environment. In this process, as described above, the temperature sensor 62 detects the temperature around the circulating pump 64, the temperature judging unit 102 in the ECU 80 judges whether the temperature in the environment is low on the basis of the detected temperature, and the ECU 80 performs the at-starting freezing judging control operation if the temperature in the environment is low. In the at-starting freezing judging control operation, the ECU 80 operates according to the flowchart of FIG. 6.

Figure 6:
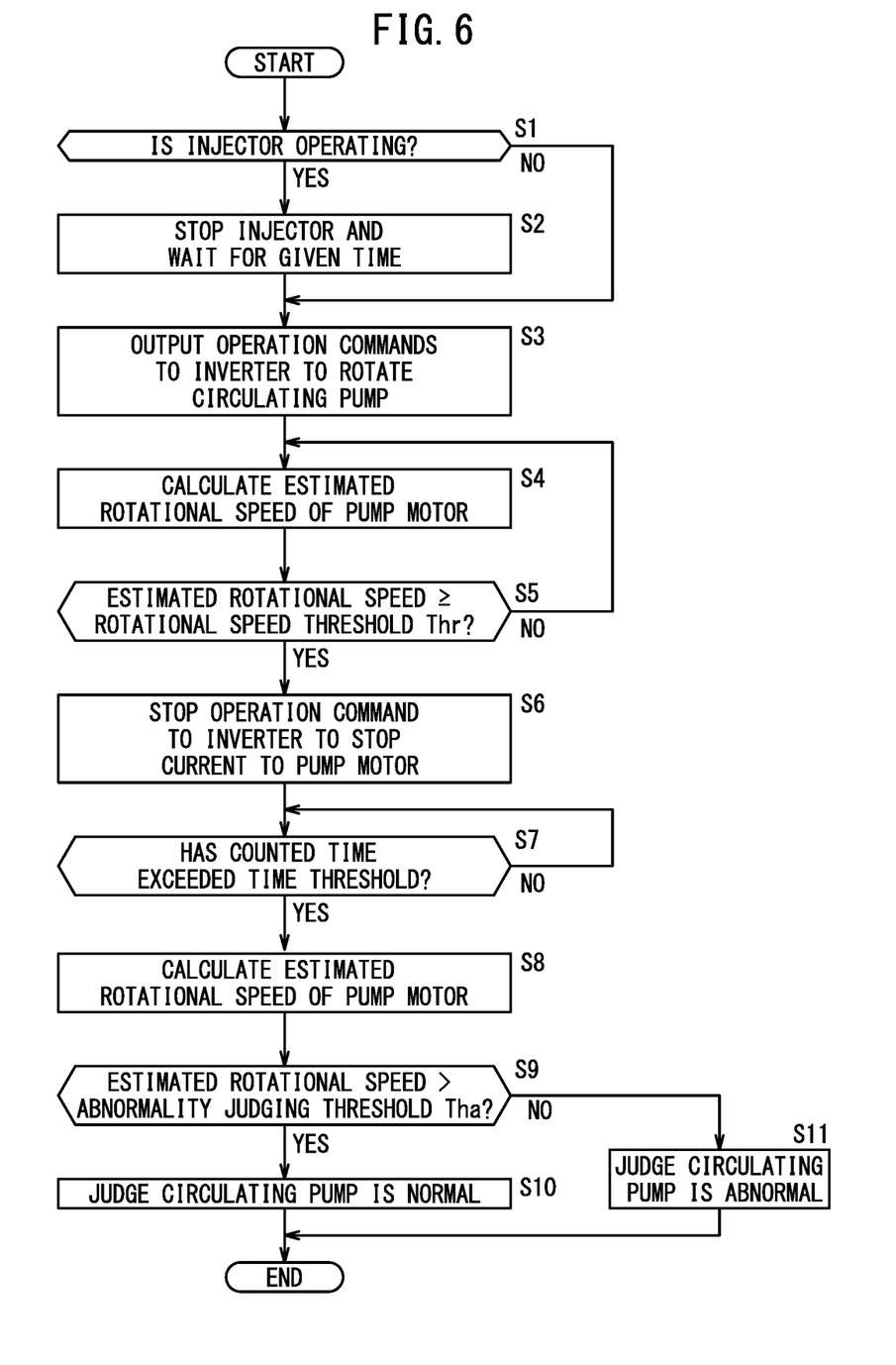
FIG. 6 is a flowchart illustrating a method for operating the fuel cell system.

In this case, in the ECU 80, first, the injector monitoring unit 104 checks the contents of operation of the injector control unit 92 to determine whether the injector 50 is operating (step S1). If the injector 50 is operating (step S1: YES), the ECU 80 provides an instruction to the injector control unit 92 to temporarily stop the injector 50, and waits for a given time period until the influence of the injection of the fuel gas from the injector 50 disappears (step S2).

If the injector 50 is not operating (step S1: NO), or after the execution of step S2, the at-starting rotating procedure setting unit 106 outputs operation commands to the inverter 72 through the pump driving-control unit 96 according to the above-described procedure, so as to rotate the circulating pump 64 (step S3). That is, the at-starting rotating procedure setting unit 106 sequentially performs the stop mode, position confirming mode, determining current-passing mode, and initial accelerating current-passing mode.

Then, during the period of execution of the initial accelerating current-passing mode, the estimated rotational speed calculating unit 98 calculates the estimated rotational speed of the pump motor 66 based on the detection signal of an off-state current sensor 74 among the current sensors 74a, 74b, 74c (step S4). Further, the rotational speed judging unit 108 monitors whether or not the estimated rotational speed of the pump motor 66 becomes equal to or higher than the rotational speed threshold Thr (step S5). If the estimated rotational speed is below the rotational speed threshold Thr (step S5: NO), the process returns to step S4 to repeat the same operation. On the other hand, if the estimated rotational speed is equal to or higher than the rotational speed threshold Thr (step S5: YES), the process moves to step S6.

In step S6, the at-starting rotating procedure setting unit 106 stops the operation command to the inverter 72 through the pump driving-control unit 96, to thereby stop the supply of three-phase alternating-current power to the pump motor 66 (first step). That is, it performs the inertial operation mode. The elapsed time judging unit 110 counts time from the start of the inertial operation mode and judges whether the counted time has exceeded the time threshold Tht (step S7). This operation is continued if the counted time is below the time threshold Tht (step S7: NO), while the process moves to step S8 if the counted time has exceeded the time threshold Tht (step S7: YES).

In step S8, the estimated rotational speed calculating unit 98 calculates the estimated rotational speed of the pump motor 66 in the inertial operation mode. At this time, the estimated rotational speed calculating unit 98 calculates the estimated rotational speed of the pump motor 66 based on the signals detected respectively by the current sensors 74a, 74b, 74c.

The abnormality judging unit 112 compares this calculated, estimated rotational speed with the abnormality judging threshold Tha (step S9: second step). Then, if the estimated rotational speed exceeds the abnormality judging threshold Tha (step S9: YES), it judges that the circulating pump 64 is normal, i.e., the circulating pump 64 is not frozen (step S10). On the other hand, if the estimated rotational speed is equal to or lower than the abnormality judging threshold Tha (step S9; NO), then it judges that the circulating pump 64 is abnormal, i.e., the circulating pump 64 is frozen (step S11).

Having performed the process above, the starting control unit 100 ends the at-starting freezing judging control operation. The ECU 80 performs normal control operation if the circulating pump 64 is normal, in which case it rotates the pump motor 66 so as to achieve the target rotational speed that is set by the pump normal-control unit 94. On the other hand, if the circulating pump 64 is abnormal, the ECU 80 performs an appropriate abnormality control operation (a control operation to promote the unfreezing of the circulating pump 64, a control operation to increase the amount of injection from the injector 50, etc.).

Figure 7:
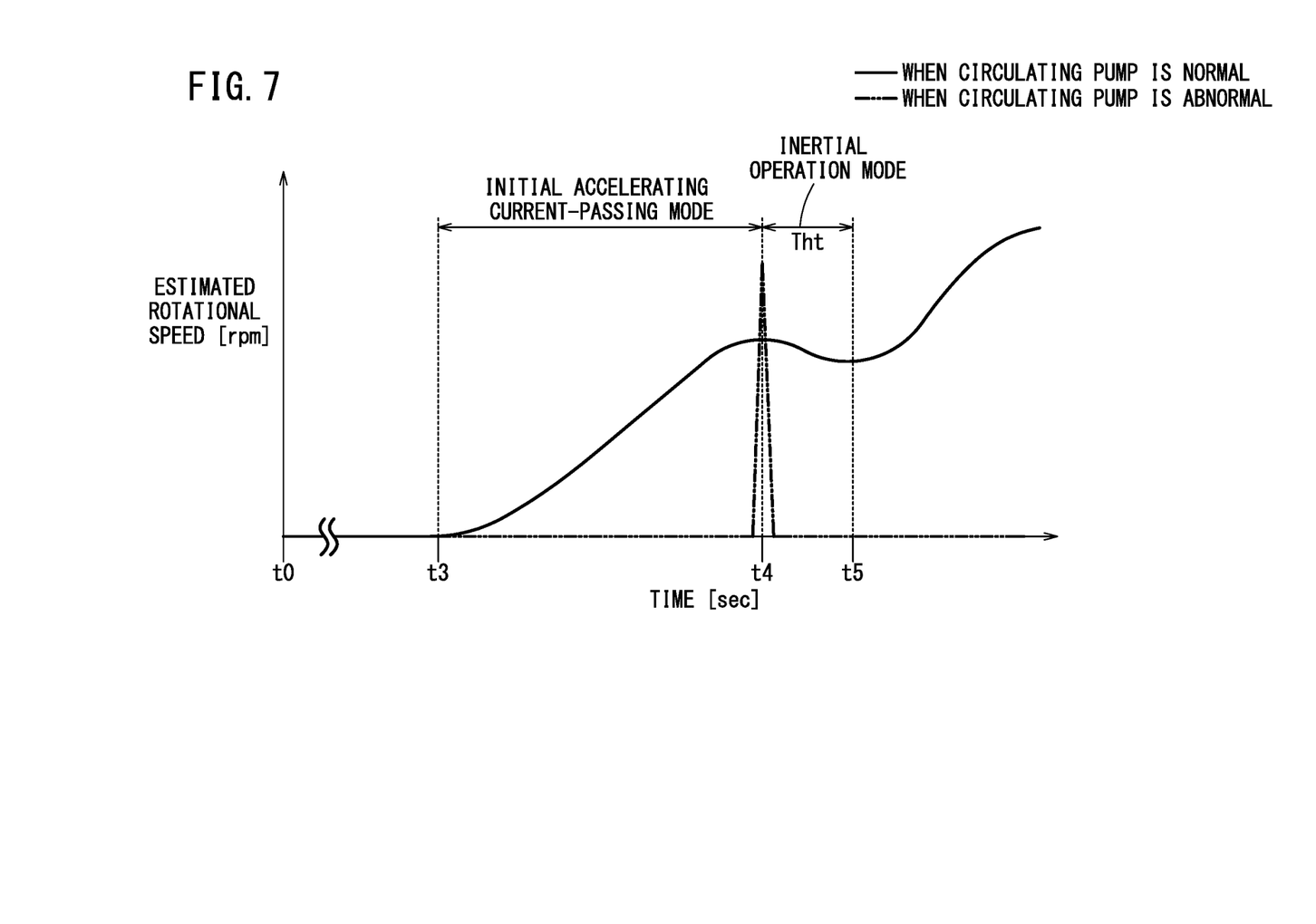
FIG. 7 is a graph showing an example of variations of the estimated rotational speed in the cases where the circulating pump is normal and abnormal.

Next, referring to FIG. 7, a time variation of the estimated rotational speed of the circulating pump 64 in a normal condition (when not frozen) and a time variation of the estimated rotational speed of the circulating pump 64 in an abnormal condition (when frozen) will be described. In FIG. 7, times t0, t3, t4, t5 correspond to time t0, t3, t4, t5 in FIG. 5, respectively.

At time t3, the ECU 80 (at-starting rotating procedure setting unit 106) performs the initial accelerating current-passing mode as described above. The estimated rotational speed of the pump motor 66 hence rapidly rises. If the circulating pump 64 is frozen at this time, the impeller 68 and the rotor vibrate and so the estimated rotational speed varies to rise and then fall in a peaked form.

Then, at time t4 at which the estimated rotational speed has reached the given rotational speed (rotational speed threshold Thr), the ECU 80 (at-starting rotating procedure setting unit 106) performs the inertial operation mode as described above. If the circulating pump 64 is frozen at this time, the peaked estimated rotational speed exceeds the given value (rotational speed threshold Thr) and then the ECU 80 moves to the inertial operation mode.

In the inertial operation mode, the supply of the three-phase alternating-current power to the pump motor 66 from the inverter 72 is stopped so that the impeller 68 and the rotor rotate by inertia. Accordingly, if the circulating pump 64 is not frozen, the estimated rotational speed of the pump motor 66 once decreases. Then, the aforementioned abnormality judgment is made in the inertial operation mode as described above to judge that the circulating pump 64 is normal. Then, the operation moves to normal control from time t5 at which the given time (time threshold Tht) has passed from the inertial operation mode, and then the estimated rotational speed rises again. In the normal control, the inverter 72 is controlled to achieve the target rotational speed that is set by the pump normal-control unit 94, whereby the estimated rotational speed varies around the target rotational speed.

On the other hand, if the circulating pump 64 is frozen, the estimated rotational speed of the pump motor 66 rapidly falls to 0 rpm when the inertial operation mode is executed. Hence, at time t5 at which the given time (time threshold Tht) has passed from the inertial operation mode, the estimated rotational speed becomes 0 rpm (at or below the abnormality judging threshold Tha), whereby the circulating pump 64 is judged to be abnormal.

The present invention is not limited to the embodiments described above and various modifications are possible according to the essence and gist of the invention. For example, when the oxygen-containing-gas-related devices 16 in the fuel cell system 10 include a circulating pump (not shown) for circulating the oxygen-containing off-gas discharged from the fuel cell stack 12, the at-starting freezing judging control can be applied to this circulating pump in the same way as described above.

Technical ideas and effects that can be grasped from the embodiments above are recited below.

A first aspect of the present invention provides a method for operating a fuel cell system 10 including a fuel cell stack 12, a reactant gas supply channel (fuel gas supply channel 40) for supplying a reactant gas (fuel gas) into the fuel cell stack 12, a reactant gas circulation channel (fuel gas circulation channel 44) for circulating a reactant off-gas (fuel off-gas) discharged from the fuel cell stack 12 back into the reactant gas supply channel, a circulating pump 64 provided on the reactant gas circulation channel and driven by a motor (pump motor 66) having no rotation detecting sensor, and a control unit (ECU 80) configured to control the rotation of the motor. The method includes: a first step of causing the control unit to rotate the motor when starting, and stop supply of electric power to the motor after a rotational speed of the motor has reached a given value; and a second step of, in an inertial period (inertial operation mode) in which the motor rotates by inertia after the first step, causing the control unit to determine whether or not the rotational speed of the motor has become equal to or lower than a predetermined value within a given time period. The control unit is configured to determine, in the second step, that the circulating pump 64 is abnormal if the rotational speed has become equal to or lower than the predetermined value.

The method for operating the fuel cell system 10 can reliably determine whether the circulating pump 64 is operating normally by judging whether the rotational speed of the motor (pump motor 66) has become equal to or lower than a predetermined value within a given time period in the inertial period in which the motor rotates by inertia. This enables the fuel cell system 10 to accurately recognize whether the circulating pump 64 is normal or abnormal within a short period so that a necessary measure can be taken in an early stage. For example, the fuel cell system 10 can take measures such as increasing the amount of the reactant gas supplied into the fuel cell stack 12 from the reactant gas supply channel (fuel gas supply channel 40), performing a control to promote unfreezing of the circulating pump 64, and so on. As a result, the fuel cell system 10 can reduce deterioration of the fuel cell stack 12.

The motor (pump motor 66) is configured to rotate based on the supply of three-phase alternating-current power, the fuel cell system 10 further includes a current sensor 74 for detecting current of the three-phase alternating-current power supplied to the motor, and current based on an induced voltage produced by the motor in the inertial period, and the rotational speed of the motor is calculated by the control unit (ECU 80) based on a detection signal of the current sensor 74. Thus, even if the circulating pump 64 adopts a sensorless motor, the fuel cell system 10 can accurately calculate the rotational speed of the motor by detecting the currents based on the induced voltage of the motor in the inertial period by using the current sensor 74.

The current sensor 74 detects all of the three phases of the current based on the induced voltage in the inertial period, and the control unit (ECU 80) calculates the rotational speed of the motor (pump motor 66) based on currents of all of the detected three phases. Thus, the fuel cell system 10 can calculate the rotational speed of the motor more accurately.

The control unit (ECU 80) stops the execution of the first step and the second step if the reactant gas (fuel gas) is being supplied to the fuel cell stack 12. Accordingly, the execution of the first step and the second step can be avoided in situations where the rotation of the circulating pump 64 is reinforced by the flow of the reactant gas being supplied, which prevents lowering of the accuracy of the determination as to whether the circulating pump 64 is normal or abnormal.

The reactant gas comprises two reactant gases, and the reactant gas supply channel is a fuel gas supply channel 40 for supplying, into the fuel cell stack 12, a fuel gas which is one of the reactant gases, the fuel gas supply channel 40 has an injector 50 for injecting the fuel gas, and the control unit (ECU 80) stops the execution of the first step and the second step while the injector 50 is operating. Thus, the fuel cell system 10 can avoid the execution of the first step and the second step while the injector 50 is injecting the fuel gas.

What is claimed is:

1. A method of operating a fuel cell system including
   a fuel cell stack,
   a reactant gas supply channel configured to supply a reactant gas into the fuel cell stack,
   a reactant gas circulation channel configured to circulate a reactant off-gas discharged from the fuel cell stack back into the reactant gas supply channel,
   a circulating pump provided on the reactant gas circulation channel and driven by a motor having no rotation detecting sensor, and
   a control unit configured to control rotation of the motor, the method comprising:
   a first step of causing the control unit to rotate the motor when starting, and stop supply of electric power to the motor after a rotational speed of the motor has reached a given value; and
   a second step of, in an inertial period in which the motor rotates by inertia after the first step, causing the control unit to determine whether or not the rotational speed of the motor has become equal to or lower than a predetermined value within a given time period,
   the control unit being configured to determine, in the second step, that the circulating pump is abnormal if the rotational speed has become equal to or lower than the predetermined value.

2. The method of operating the fuel cell system according to claim 1, wherein
   the motor is configured to rotate based on supply of three-phase alternating-current power,
   the fuel cell system further includes a current sensor configured to detect current of the three-phase alternating-current power supplied to the motor, and current based on an induced voltage produced by the motor in the inertial period, and
   the rotational speed of the motor is calculated by the control unit based on a detection signal of the current sensor.

3. The method of operating the fuel cell system according to claim 2, wherein
   the current sensor detects all of the three phases of the current based on the induced voltage in the inertial period, and
   the control unit calculates the rotational speed of the motor based on currents of all of the detected three phases.

4. The method of operating the fuel cell system according to claim 1, wherein the control unit stops execution of the first step and the second step if the reactant gas is being supplied to the fuel cell stack.

5. The method of operating the fuel cell system according to claim 4, wherein
   the reactant gas comprises two reactant gases, and the reactant gas supply channel is a fuel gas supply channel configured to supply, into the fuel cell stack, a fuel gas which is one of the reactant gases,
   the fuel gas supply channel includes an injector configured to inject the fuel gas, and the control unit stops the execution of the first step and the second step while the injector is operating.

\* \* \* \* \*